US008713038B2

(12) United States Patent
Cohen et al.

(10) Patent No.: US 8,713,038 B2
(45) Date of Patent: Apr. 29, 2014

(54) INTEGRATING MAP-REDUCE INTO A DISTRIBUTED RELATIONAL DATABASE

(75) Inventors: Jeffrey Ira Cohen, Sunnyvale, CA (US); Luke Lonergan, San Carlos, CA (US); Caleb E. Welton, Foster City, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 217 days.

(21) Appl. No.: 12/417,550

(22) Filed: Apr. 2, 2009

(65) Prior Publication Data

US 2010/0257198 A1     Oct. 7, 2010

(51) Int. Cl.
*G06F 17/30* (2006.01)

(52) U.S. Cl.
USPC .......................... 707/764; 707/792; 707/796

(58) Field of Classification Search
CPC ................................................ G06F 17/30455
USPC ................... 707/770, 792, 796, 764
See application file for complete search history.

(56) References Cited

U.S. PATENT DOCUMENTS

| | | | |
|---|---|---|---|
| 7,650,331 B1 * | 1/2010 | Dean et al. ..................... | 712/203 |
| 7,917,463 B2 * | 3/2011 | Dagum et al. .................. | 707/600 |
| 7,921,416 B2 * | 4/2011 | Fontoura et al. ............... | 717/139 |
| 7,966,340 B2 * | 6/2011 | Friedman et al. .............. | 707/764 |
| 8,150,889 B1 * | 4/2012 | Bacthavachalu et al. ..... | 707/802 |
| 8,260,840 B1 * | 9/2012 | Sirota et al. ................... | 709/201 |
| 2008/0120314 A1 * | 5/2008 | Yang et al. ..................... | 707/101 |
| 2010/0306286 A1 * | 12/2010 | Chiu et al. ..................... | 707/827 |

OTHER PUBLICATIONS

Srinath Shankar, "Data Processing and Workflow Scheduling in Cluster Computing Systems", Aug. 2008, Dissertation at University of Wisconsin-Madison, pp. 1-126.*
David J. DeWitt et al., "Clustera: An Integrated Computation and Data Management System", Aug. 23-28, 2008, ACM PVLDB 2008, pp. 28-41.*
David DeWitt et al., "Technical Report # 1637—Clustera: An Integrated Computation and Data Management System", Apr. 2007, Computer Sciences Department of University of Wisconsin-Madison, pp. 1-34.*
Greg Linden, "Geeking With Greg: Yahoo Pig and Google Sawzall", posted Apr. 26, 2007, online blog posting retrieved May 5, 2011, pp. 1-5.*
J. Nicholas Hoover, "Start-Ups Bring Google's Parallel Processing to Data Warehousing", InformationWeek.com, posted Aug. 29, 2008.*
Mayank Bawa & Tasso Argyros, "Winning with Data: Aster Data Systems Blog", blog posts dated Aug. 25, 2008 to Sep. 6, 2008, originally posted to www.asterdata.com/blog/, crawled by Web Archive on May 4, 2009, pp. 1-14.*
Aster Data, "In Plain Sight: Patented Aster Data SQL-MapReduce Technology Opens Eyes to Big Data Opportunities", Press Release dated Jun. 29, 2011.*

(Continued)

*Primary Examiner* — Rehana Perveen
*Assistant Examiner* — Scott A Waldron
(74) *Attorney, Agent, or Firm* — Fish & Richardson P.C.

(57) ABSTRACT

A computer readable storage medium includes executable instructions to define a map-reduce document that coordinates processing of data in a distributed database. The map-reduce document complies with a map-reduce specification that integrates map-reduce functions with queries in a query language. The operations specified by the map-reduce document are executed in the distributed database.

25 Claims, 11 Drawing Sheets

(56) References Cited

OTHER PUBLICATIONS

M. Tamer Ozsu & Patrick Valduriez, "Distributed and Parallel Database Systems", ACM Computing Surveys, vol. 28, No. 1, Mar. 1996, pp. 125-128.*

BeyeNETWORK, "Greenplum Announces General Availability of Greenplum Database 3.2", posted Sep. 26, 2008, available at http://www.b-eye-network.com/view/8659.*

Hung-chih Yang et al., "Map-Reduce-Merge: Simplified Relational Data Processing on Large Clusters", ACM SUGMOD '07, Jun. 12-14, 2007, pp. 1029-1040.*

Ajeet Singh, "Aster nCluster In-Database MapReduce: Deriving Deep Insights from Large Datasets", Aster Data Systems, Inc., crawled by the Internet Archive Wayback Machine on Oct. 31, 2008, pp. 1-11.*

Yuan Yu et al., "DryadLINQ: A System for General=Purpose Distributed Data-Parallel Computing Using a High-Level Language", 8th USENIX Symposium on Operating Systems Design and Implementation, Dec. 8-10, 2008, pp. 1-14.*

Ronnie Chaiken et al., "SCOPE: Easy and Efficient Parallel Processing of Massive Data Sets", Aug. 28, 2008, ACM PVLDB '08, pp. 1265-1276.*

"Greenplum Database 3.2 Administrator Guide", Greenplum Inc., last revised Oct. 1, 2008, 849 pages.*

"MapReduce + SQL Using Open Source Software and Tools," http://en.oreilly.com/mysql2009/public/schedule/detail/7055, 4 pages, printed on Apr. 2, 2009.

"Welcome to Pig!" http://hadoop.apache.org/pig/, 2 pages, Mar. 9, 2009.

Olston, C. et al. "Pig Latin: A Not-So-Foreign Language for Data Processing" http://www.cs.cmu.edu/~olston/publications/sigmod08.pdf, SIGMOD'08, 12 pages, Jun. 9-12, 2008.

Microsoft Research, http://research.microsoft.com/en-us/projects/Dryad/, 3 pages, printed Apr. 2, 2009.

* cited by examiner

INTEGRATING MAP-REDUCE INTO A DISTRIBUTED RELATIONAL DATABASE

FIELD OF THE INVENTION

The invention relates generally to distributed data processing. More particularly, the invention relates to integrating map-reduce processing techniques into a distributed relational database.

BACKGROUND OF THE INVENTION

Map-reduce or MapReduce is a software framework for computing distributable problems using a large number of computing nodes, collectively referred to as a cluster. In the "map" step, a master node takes the input, divides it into smaller sub-problems, and distributes the sub-problems to worker nodes. The worker node processes that smaller problem, and passes the answer back to its master node. In the "reduce" step, the master node takes the answers to all the sub-problems and combines them in a way to get the output—the answer to the problem it was originally trying to solve. The reduce operation can be executed in parallel over partitions of data. A map-reduce operation typically utilizes parallelism for both the map and reduce steps.

FIG. 1 illustrates processing operations 100 associated with map-reduce. Input data 105 is mapped 110 into individual tasks 115, 120, 125, which are subsequently executed. A reduce function 130 combines the results to produce output data 135.

FIG. 2 illustrates the implementation of these processing operations in a network 200. A client 205 specifies input data, which may be passed over a local area network 215 to a master host 210. The master host 210 produces a query plan specifying the map and reduce operations. Individual tasks are distributed to a set of segment hosts 225, 230, 235 and 240 via an interconnect 220. The segment hosts compute their tasks and reduce results. A final output may be passed to client 205, if specified by the output specification.

The advantage of map-reduce is that it allows for distributed processing of the map and reduction operations. Provided each mapping operation is independent of the other, all maps can be performed in parallel—though in practice it is limited by the data source and/or the number of nodes near the data. Similarly, a set of "reducers" can perform the reduction phase—all that is required is that all outputs of the map operation that share the same key are presented to the same reducer at the same time. While this process can often appear inefficient compared to algorithms that are more sequential, map-reduce can be applied to significantly larger datasets than that which typical servers can handle. The parallelism also offers some possibility of recovering from partial failure of servers or storage. That is, if one mapper or reducer fails, the work can be rescheduled, assuming the input data is still available.

One problem with existing map-reduce implementations is that a common source format is required. Therefore, different forms of data are normalized to the common source format. For example, one may need to export data from a relational database into files or vice versa to achieve a common source format. It would be desirable to directly operate on a data source in its native format.

Another problem with existing map-reduce implementations is that a programmer shoulders the burden of data management operations. For example, data access routines must be specified Similarly, remote connectivity and coordination between nodes must be specified. A single programmer typically does not have all of the skills required to specify an efficient query plan. For example, map-reduce operations are commonly implemented by general software developers working with files, while database processing operations are commonly implemented by enterprise application programmers with expertise in accessing transactional records using a query language, such as Structured Query Language (SQL). It would be desirable to remove barriers between programming styles and expertise so that a single programmer could effectively implement map-reduce operations.

SUMMARY OF THE INVENTION

The invention includes a computer readable storage medium with executable instructions to define a map-reduce document that coordinates processing of data in a distributed database. The map-reduce document complies with a map-reduce specification that integrates map-reduce functions with queries in a query language. The operations specified by the map-reduce document are executed in the distributed database.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
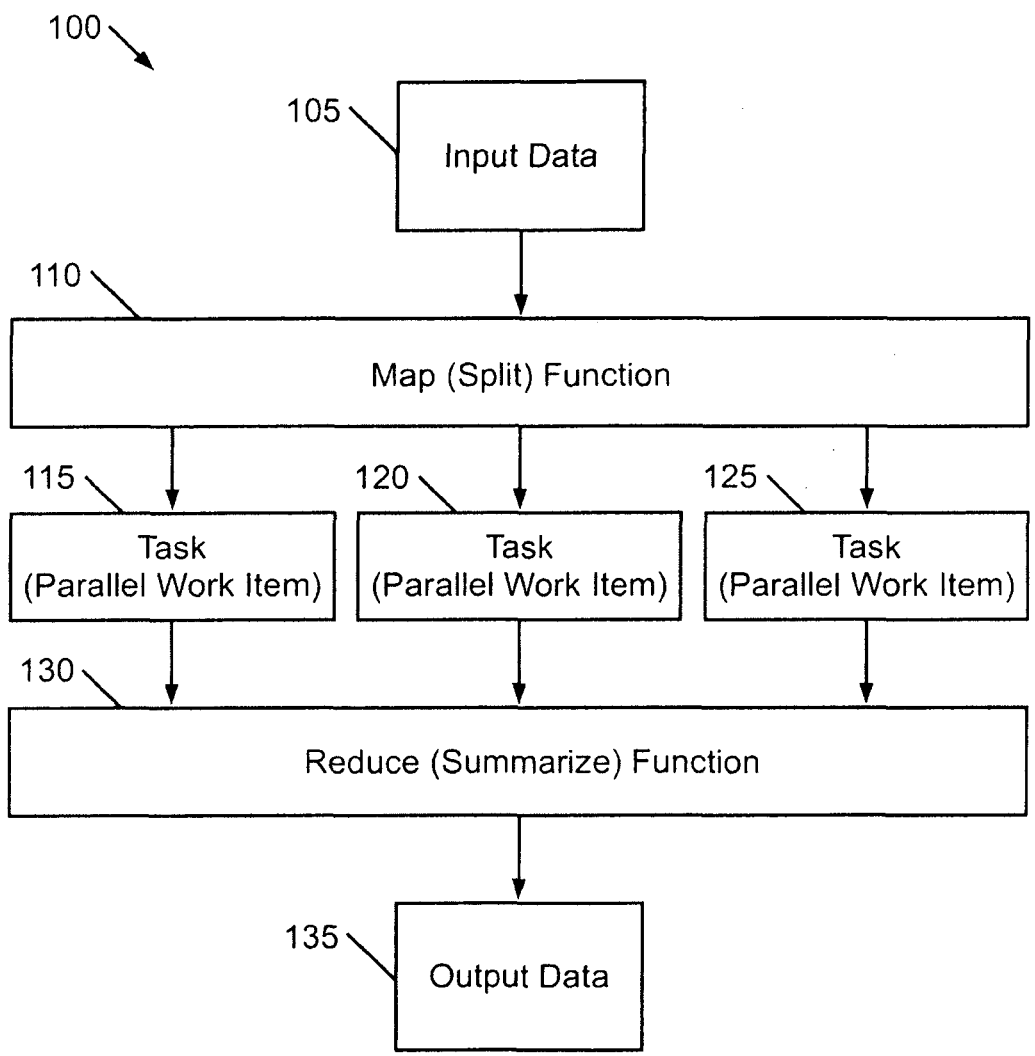
FIG. 1 illustrates map-reduce operations performed in accordance with the prior art.
Figure 2:
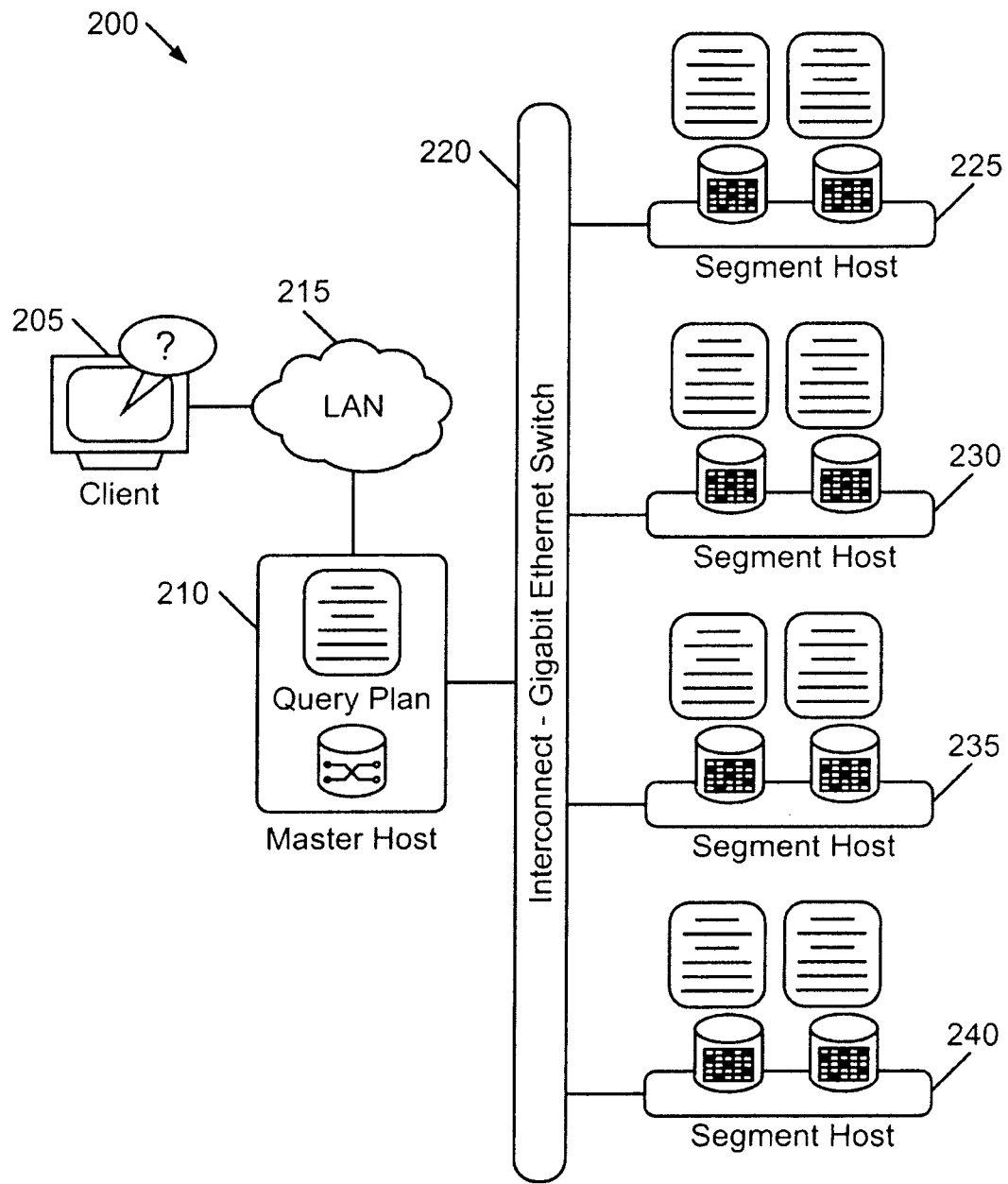
FIG. 2 illustrates a network implementation of map-reduce operations in accordance with the prior art.
Figure 3:
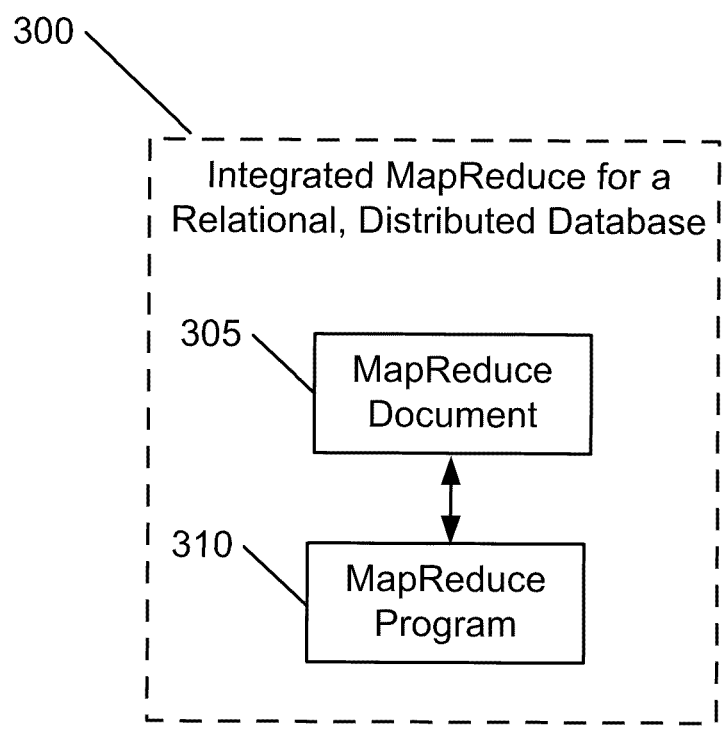
FIG. 3 illustrates a map-reduce document and map-reduce program processed in accordance with an embodiment of the invention.

FIG. 3 illustrates an embodiment of the invention 300 for integrated map-reduce processing within a distributed relational database. In particular, the figure illustrates that a map-reduce document 305 interacts with a map-reduce program 310. The map-reduce document 305 and map-reduce program 310 may be on any machine within a network. Typically, the map-reduce document 305 is formed on a client machine and the map-reduce program 310 operates on a master host.

The map-reduce document 305 coordinates processing of data in a distributed database. The map-reduce document 305 complies with a map-reduce specification that integrates map-reduce functions with queries of a query language, e.g., Structure Query Language (SQL). The map-reduce program 310 executes operations specified by the map-reduce document 305 across a distributed database.

Figure 4:
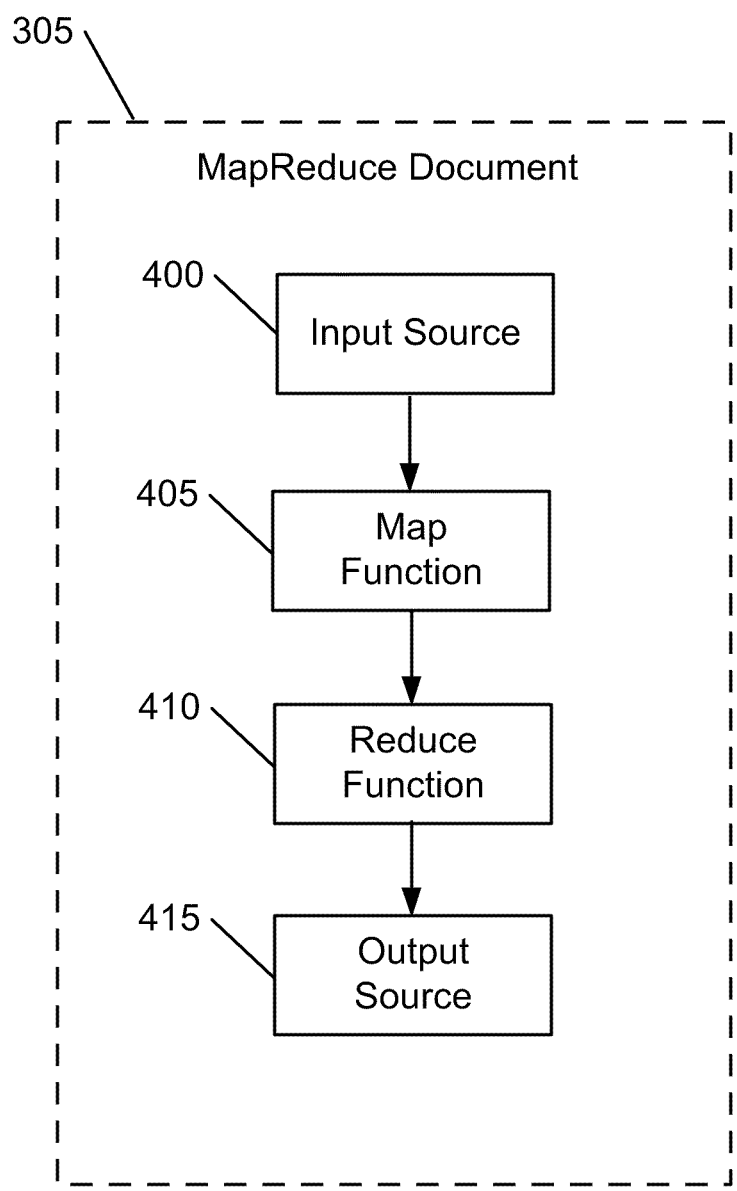
FIG. 4 illustrates processing associated with a map-reduce document configured in accordance with an embodiment of the invention.

FIG. 4 illustrates processing specified by a map-reduce document 305. In an embodiment of the invention, an input source 400 is specified. A map function 405 and reduce function 410 are also specified. Finally, an output source 415 is specified. The specification of this information is expressed in a manner that is tightly integrated with the core engine controlling the distributed database, as demonstrated below. In this way, the parallelism of the core engine of the distributed database is leveraged by the MapReduce document 305 to simplify commands. For example, parallel data access and data exchange commands need not be expressed in the MapReduce document 305. Rather, this inherent functionality of the MapReduce program 310 is relied upon.

Figure 5:
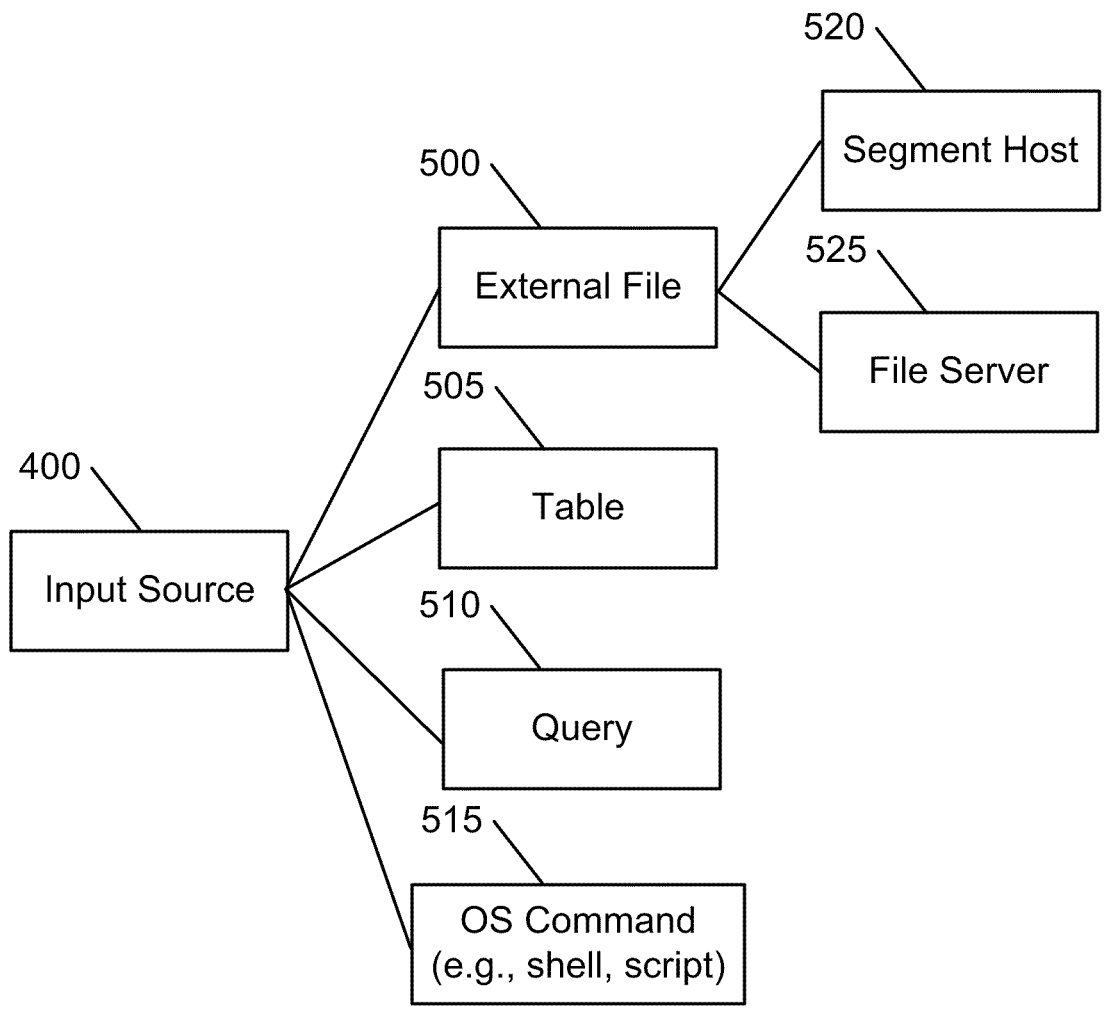
FIG. 5 illustrates various input sources processed in accordance with an embodiment of the invention.

FIG. 5 illustrates the nature of an input source 400. The input source 400 collectively refers to one or more sources that are operated upon in their native format (i.e., without combining the source data into a normalized or standard format). In one embodiment, the input source 400 includes input from an external file, which includes components on a segment host 520 and a file server 525. In this example, the input source 400 also includes a table 505, a query 510 and an operating system command 515. Examples of processing various input sources in accordance with the invention are provided below.

Figure 6:
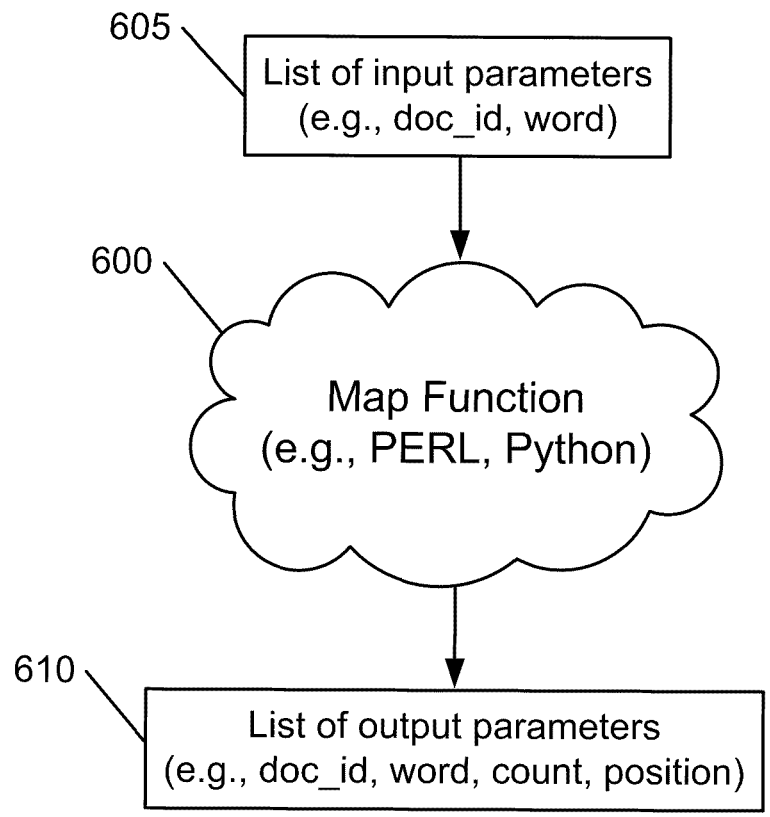
FIG. 6 illustrates map processing utilized in accordance with an embodiment of the invention.

FIG. 6 illustrates a map operation performed in accordance with an embodiment of the invention. The map operation includes a map function 600, which may be implemented in a scripting language, such as PERL or Python. The map function 600 receives a list of input parameters 605. For example, the input parameters 605 may specify a document id and a word. The map function 600 generates a list of output parameters, such as a document id, word, count, position. In this example, the document id operates as a key across nodes that perform the specified processing. The output parameters provide a count (e.g., the number of instances) of the word and the location of the word.

Figure 7:
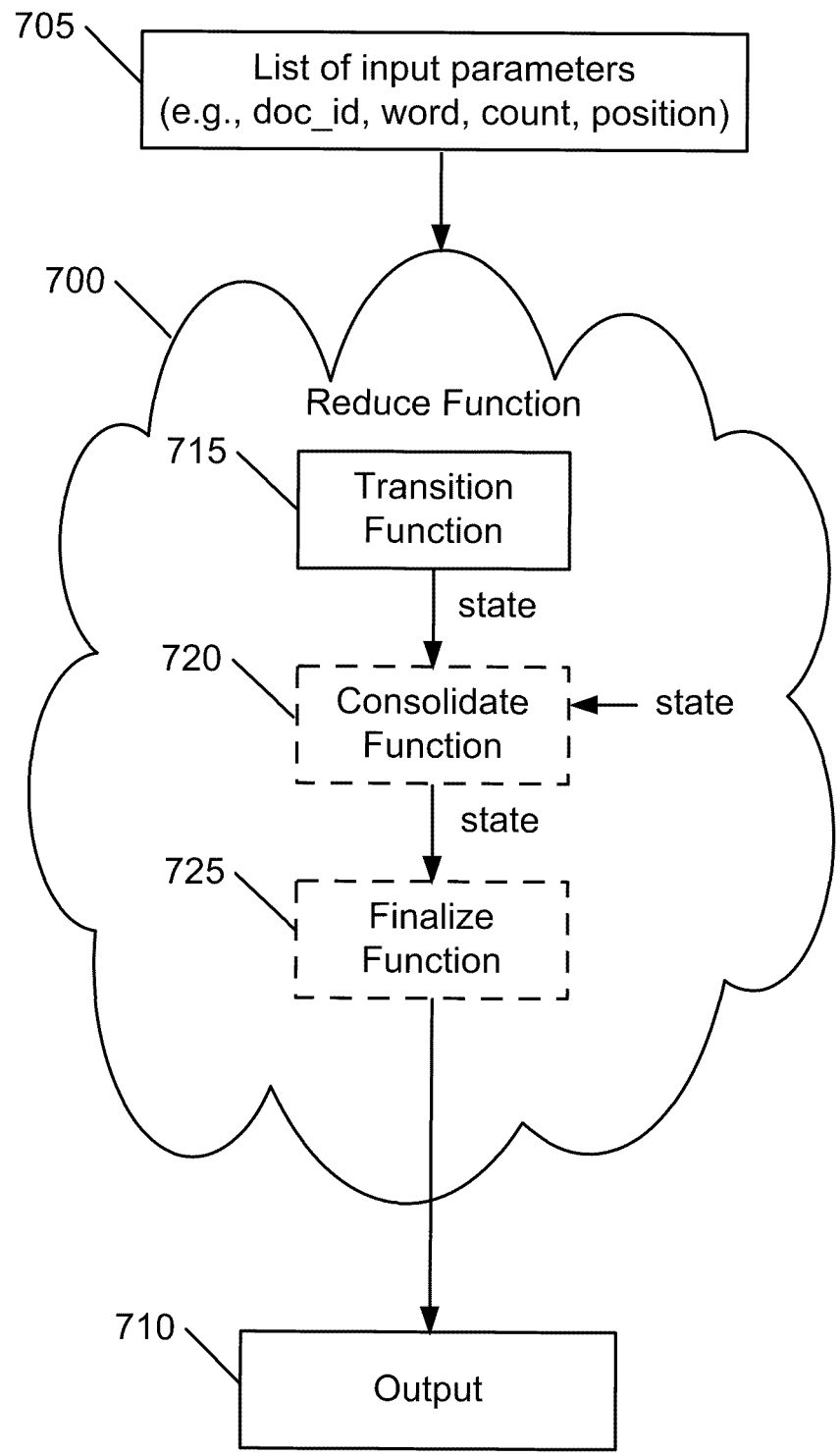
FIG. 7 illustrates reduce processing utilized in accordance with an embodiment of the invention.

The list of output parameters 610 from the Map Function 600 of FIG. 6 operates as a list of input parameters 705 to the Reduce Function 700, as shown in FIG. 7. In one embodiment, the reduce function 700 is implemented to produce various intermediate results. For example, a transition function 715 produces transition output, a consolidate function 720 produces consolidate output and a finalize function 725 produces finalize output, as further discussed below. This results in reduce function output 710.

Figure 8:
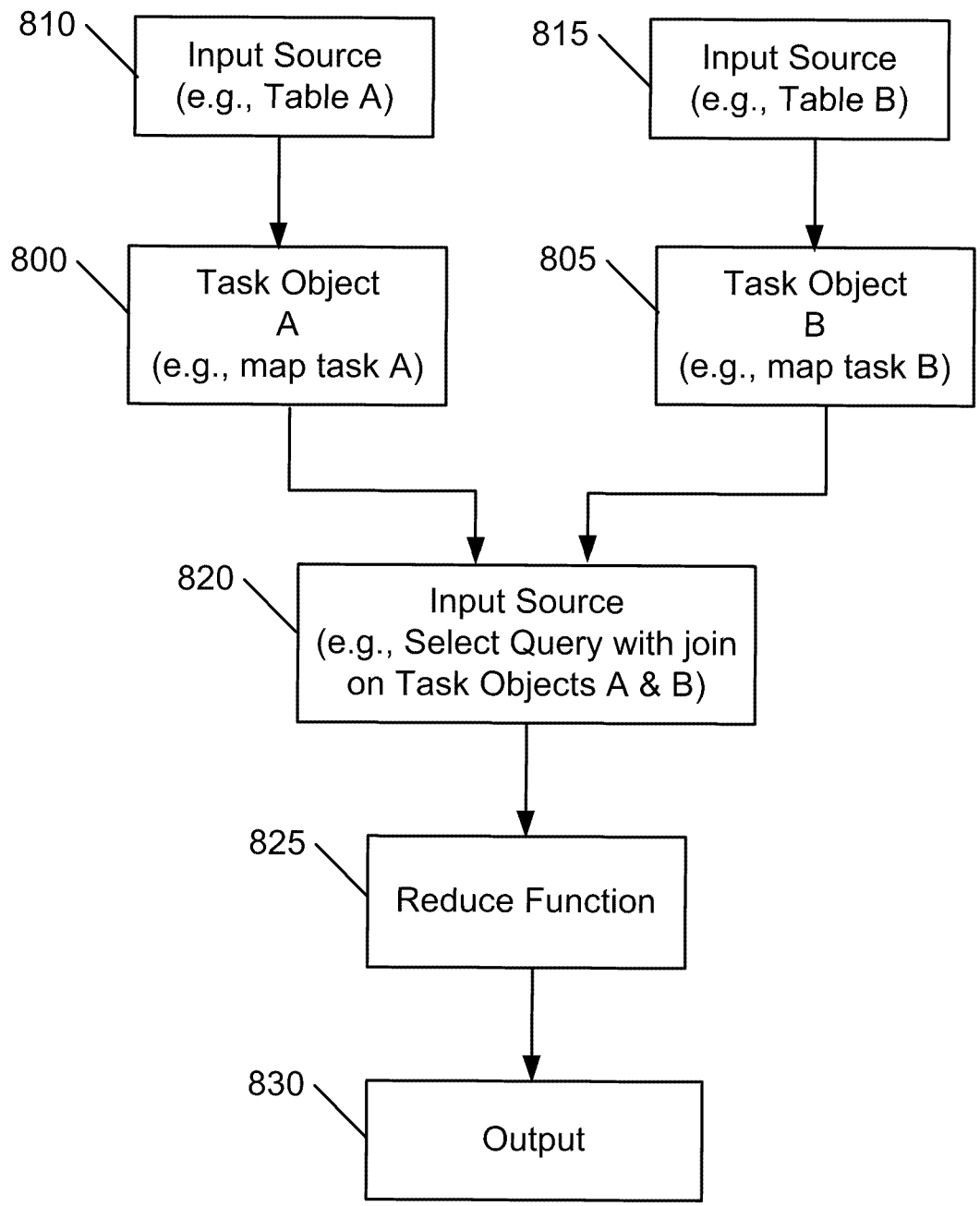
FIG. 8 illustrates the processing of various input sources and task objects in accordance with an embodiment of the invention.

FIG. 8 illustrates the processing of various input sources in accordance with an embodiment of the invention. An input source (e.g., Table A) 810 is associated with a Task Object A 800. Another input source (e.g., Table B) 815 is associated with a Task Object B 805. An input source 820 operates to integrate these disparate input sources (e.g., select query with join on Task Objects A & B) 820. A reduce function 825 operates on this input source 820 to produce an output 830.

Figure 9:
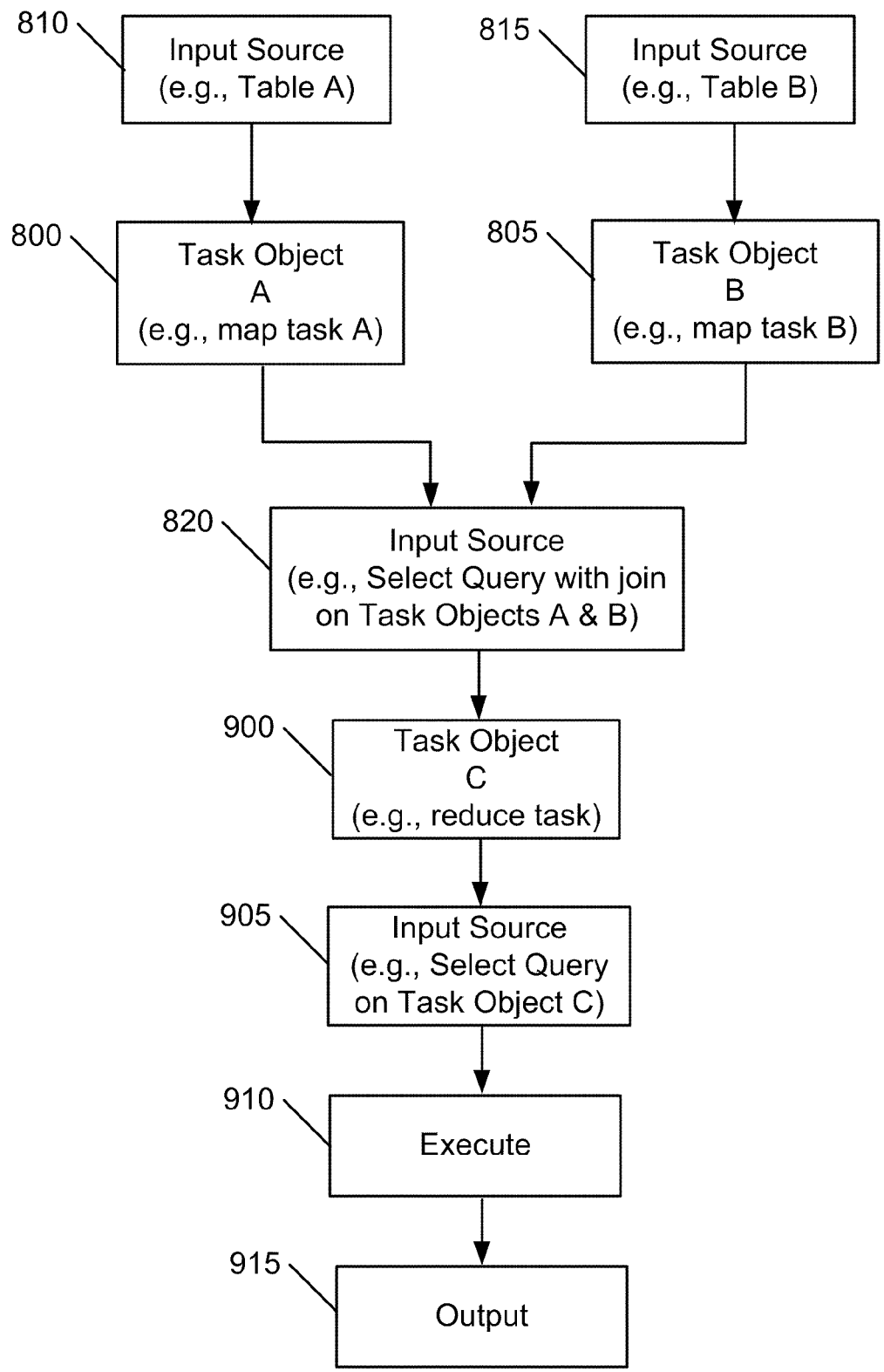
FIG. 9 illustrates the processing of various input sources and task objects in accordance with an alternate embodiment of the invention.

FIG. 9 illustrates blocks 810, 800, 815, 805 and 820 of FIG. 8 being processed to produce a Task Object C 900. In this example, the Task Object is a reduce task. At this point, the input source 905 is a select query on task object C. The task object is executed 910 to produce output 915.

The invention is more fully appreciated with reference to specific examples, provided below. As shown in FIG. 3, a map-reduce document 305 is applied to a map-reduce program 310. In one embodiment, the map-reduce program 310 is associated with the core engine of a distributed database, which takes care of the details of distributing the input data, executing the program across a set of machines, handling machine failures, and managing the required inter-machine communication. The map-reduce program 310 operates as an abstraction allowing programmers to focus on their desired data computations, while hiding the details of parallelism, distribution, load balancing and fault tolerance, which are handled by the map-reduce program 310, without input from the programmer.

As discussed in connection with FIG. 4, the map-reduce document 305 includes:

Input Data—Input data can come from a number of sources either inside or outside the database. The invention supports a number of file formats for external data as well as SQL for data already stored in the database.

Map Function—Users provide their own map function(s) written in a computer language (e.g., Python or PERL).

Reduce Function—Users provide their own reduce function(s) written in a computer language, or use one of the built-in reduce functions.

Output Data—Output can be persistently stored in the database or directed to standard output or an external file.

Every map-reduce document 305 requires at least one input data source. A data source can be a single file, files served by a parallel file distribution program, a table in the database, an SQL SELECT statement, or an operating system command that outputs data. A file input describes a single file located on a machine that is a segment host. In one embodiment, the file is in either text-delimited or comma-separated values (CSV) format. If columns (delimited fields in the file) are not specified, the entire file is treated as one big text column named value by default. Below is an example of code used to specify an input in a map-reduce document 305.

```
INPUT:
    NAME: my_file_input
    FILE: seghostname:/var/data/gpfiles/employees.txt
    COLUMNS
        first_name text
        last_name text
        dept text
        hire_date text
    FORMAT: TEXT
    DELIMITER: |
```

An embodiment of the invention is implemented by Greenplum, of San Mateo, Calif. In this embodiment, the Greenplum parallel file distribution program (gpfdist) operates as the map-reduce program 310. GPFDIST input is similar to file input, except that the file is served by gpfdist, rather than the file system on a single segment host. One advantage of using the gpfdist file server (as opposed to the file input) is that it ensures that all of the segments in a Greenplum Database system are fully utilized when reading the external data file(s). The code below is an example of using gpfdist as an input.

```
INPUT:
    NAME: my_distributed_input
    # specifies the host, port and the desired files served
    # by gpfdist. /* denotes all files on the gpfdist server
    GPFDIST:
        gpfdisthost:8080:/*
    COLUMNS
        first_name text
        last_name text
        dept text
        hire_date text
    FORMAT: TEXT
    DELIMITER: |
```

A table input takes all data from the table specified. The columns and data types are already defined by the table definition. Therefore, a simple expression, as follows, may be used.

```
INPUT:
    NAME: my_table_input
    TABLE: sales
```

Similarly, a QUERY input specifies a SELECT statement that returns selected data from one or more tables. The columns and data types are already defined by the sourced table columns. Therefore, a simple expression, as follows, may be used.

```
INPUT:
    NAME: my_query_input
    QUERY: SELECT vendor, amt FROM sales WHERE region='usa';
```

In an embodiment of the invention utilizing a Greenplum database, an EXEC input allows one to specify a shell command or script that will be executed by all Greenplum segments. The combined output of all the segment processes comprises the data source. The command is executed by all active segment instances on all segment hosts. For example, if each segment host has four primary segment instances running, the command will be executed four times per segment host. Data is comprised of the output of the command at the time the map-reduce job is executed on each segment instance. All segment instances execute the command in parallel. If the command calls a script or program, that executable must reside on all segment hosts. An example use of the EXEC input is provided below.

```
INPUT:
    NAME: my_query_input
    EXEC: /var/load_scripts/get_log_data.sh
    COLUMNS
        url text
        date timestamp
    FORMAT: TEXT
    DELIMITER: |
```

To borrow from database terminology, a map function takes as input a single row (a set of values assigned to parameters), and produces zero or more rows of output. By default, the input and output are both defined to have two parameters of type text, called key and value. However, an embodiment of the invention allows arbitrary parameter lists to be defined for both the input and the output in the style of SQL table definitions. The input format is specified in the PARAMETERS definition in the MAP specification; the output format is specified in the RETURNS definition. The RETURNS definition requires each output parameter to be assigned a SQL data type for use in subsequent steps involving table outputs or SQL query inputs. When in doubt, SQL's text data type will usually work fine, since both PERL and Python will interpret text strings appropriately.

The MAP specification also includes a FUNCTION definition that provides the code for the function, in a scripting language specified via LANGUAGE.

A typical Map function definition uses the values in the PARAMETERS in some way to generate appropriate output values matching the format of the RETURNS declaration. So the main issue for defining a Map function is to know how to access the PARAMETERS from within the scripting language, and how to prepare the output needed for RETURNS.

In an embodiment of the invention that uses PERL, the PARAMETERS to a Map function are available in the usual @_parameters list. A typical first step in a PERL function is to extract the parameters into local variables via an assignment statement.

The output of a Map function must be a PERL hash, with a hash-key for each parameter in the RETURNS definition. Output is typically returned to the MapReduce runtime engine 310 via a special PERL function called return_next. This function behaves like a normal return, except that when the map code is re-invoked to generate another output row, it will pick up processing on the line after the last return_next that was executed (analogous to Python's yield statement). This programming style makes it possible to take a single row as input and return multiple outputs (each being passed back via return_next from within a PERL loop). When there are no more results to pass back, a standard PERL return undef call will tell the MapReduce harness to proceed with the next row of input, starting at the top of the Map function.

If you know that the Map function will only return one row of output for every input, one can specify the definition MODE: SINGLE in the MAP specification, and pass back a hash using a standard PERL return call, rather than return_next.

The following simple Map example converts a row containing a comma-separated value into multiple rows, one per value. Note the vertical bar (the YAML 'literal' marker) after the FUNCTION: declaration, indicates that the subsequent indented lines are to be considered a single literal string.

```
- MAP:
    NAME: perl_splitter
    LANGUAGE: PERL
    PARAMETERS: [key, value]
    RETURNS: [key text, value text]
    FUNCTION: |
        my ($key, $value) = @_;
        my @list = split(/,/, $value);
        for my $item(@list) {
        return_next({"key" => $key, "value" => $item});
        }
        return undef;
```

In Python, the PARAMETERS specified for a Map function are available as local Python variables. No PERL-style parameter interpretation is necessary.

The output of a Map function is a (Python) hash, with a hash-key for each parameter in the RETURNS definition.

Output is typically returned to the MapReduce harness via the Python yield construct, but when the Map code is re-invoked to generate another output row, it will pick up processing on the line after the last yield that was executed. This programming style makes it possible to take a single row as input, and return multiple outputs (each being passed back via yield from within a Python loop). When there are no more results to pass back, the Python code should simply 'drop through' to the end of the script. This tells the MapReduce harness to proceed with the next row of input, starting at the top of the Map function.

If the Map function will only return one row of output for every input, one can specify the definition MODE: SINGLE in the MAP specification, and pass back a hash using a standard Python return call, rather than yield.

The following simple Map example converts a row containing a comma-separated value into multiple rows, one per value. Note the vertical bar—a YAML 'literal' marker—after the FUNCTION: declaration, indicates that the subsequent indented lines are to be considered a single literal string.

```
- MAP:
    NAME: py_splitter
    LANGUAGE: PYTHON
    PARAMETERS: [key, value]
    RETURNS: [key text, value text]
    FUNCTION: |
      list = value.split(',')
      for item in list:
        yield {'key': key, 'value': item}
```

Reduce functions handle a set of input rows that have matching values in a particular attribute (or set of attributes), and produce a single 'reduced' row. In one embodiment of the invention, a Greenplum database is used that provides several predefined REDUCE functions, which all operate over a column named value:

IDENTITY—returns (key, value) pairs unchanged
SUM—calculates the sum of numeric data
AVG—calculates the average of numeric data
COUNT—calculates the count of input data
MIN—calculates minimum value of numeric data
MAX—calculates maximum value of numeric data To use one of the predefined REDUCE jobs, one can declare it by name in the EXECUTE portion of a map-reduce document 305. For example:

```
EXECUTE
  - RUN
      SOURCE: input_or_task_name
      MAP: map_function_name
      REDUCE: IDENTITY
```

Writing custom Reduce functions is a bit more involved than writing Map functions, because the Reduce has to be defined to work through a set of input rows, not just a single row. To achieve this, one defines a TRANSITION function associated with the REDUCE, which is called once for each input row. In order to 'remember' information between calls of the transition function, it takes as its first input parameter a variable called state. Before a set of tuples is to be Reduced, the state variable is initialized to the value specified in the INITIALIZE definition. In one embodiment of the invention, a reducer is expressed as: initialize ( )→state/transition(state, value)→state/consolidate(state, state)→state/finalize (state)→ set of values. In an another embodiment of the invention, a reducer is expressed as: accumate(iterator)→set of values/consolidate(iterator)→set of values.

This value is a SQL data type, such as a (single-quoted) SQL text string. During the processing of a set, the state variable records the most recent return value of the TRANSITION function. After the last row in the set is processed by the TRANSITION function, the state variable is passed to the FINALIZE function, which returns multiple rows (via PERL's return_next or Python's yield). Each row returned is a hash representing the reduced output row.

By default, the parameters to a Reduce function are (key, value) pairs. However, for custom Reduce functions, an arbitrary list of columns can be passed in. The KEYS definition defines the column or columns used to partition the input into subsets to be reduced; the default value of the KEYS definition is the column called key. In the absence of a KEYS definition, the key is defined to be the set of parameters not mentioned in the TRANSITION function's PARAMETERS list.

As a performance optimization, one can optionally define a CONSOLIDATE function, which consolidates multiple state variables into a single state variable. This allows the core engine of a distributed database (e.g., a Greenplum Database) to send a state variable between machines in lieu of a set of input tuples, substantially lowering the amount of network traffic over the interconnect. CONSOLIDATE is similar to TRANSITION in its structure, taking a two state variables at each invocation and returning a single state.

Below is a complete PERL Reduce function definition for computing the average of a set of positive values:

```
- REDUCE:
    NAME: perl_pos_avg
    TRANSITION: perl_pos_avg_trans
    CONSOLIDATE: perl_pos_avg_cons
    FINALIZE: perl_pos_avg_final
    INITIALIZE: '0,0'
    KEYS: [key]
- TRANSITION:
    NAME: perl_pos_avg_trans
    PARAMETERS: [state, value]
    RETURNS: [state text]
    LANGUAGE: perl
    FUNCTION: |
      my ($state, $value) = @_;
      my ($count, $sum) = split(/,/, $state);
      if ($value > 0) {
        $sum += $value;
        $count++;
        $state = $count . "," . $sum;
      }
      return $state;
- CONSOLIDATE:
    NAME: perl_pos_avg_cons
    PARAMETERS: [state, value]
    RETURNS: [state text]
    LANGUAGE: perl
    FUNCTION: |
      my ($state, $value) = @_;
      my ($scount, $ssum) = split(/,/, $state);
      my ($vcount, $vsum) = split(/,/, $value);
      my $count = $scount + $vcount;
      my $sum = $ssum + $vsum;
      return ($count . "," . $sum);
- FINALIZE:
    NAME: perl_pos_avg_final
    PARAMETERS: [state]
```

-continued

```
    RETURNS: [value float]
    LANGUAGE: perl
    FUNCTION: |
        my ($state) = @_;
        my ($count, $sum) = split(/,/, $state);
        return_next ($count*1.0/$sum);
        return undef;
```

Defining an OUTPUT specification is optional. If no output is defined, the default is to send the final results to standard output of the client. One can also direct output to a file on the client or to a table in the database by defining an OUTPUT specification.

A TABLE output defines a table in the database where the final output of the MapReduce job is stored. By default, a table of the given TABLE name will be created in the database if it does not already exist. If the named table does exist in the database, one declares a MODE to specify if output should be added to the table (APPEND) or dropped and recreate the table (REPLACE). By default, the table is distributed by the REDUCE keys or one can optionally declare a distribution column using the KEYS specification.

```
    - OUTPUT:
        NAME: gpmr_output
        TABLE: wordcount_out
        KEYS:
            - value
        MODE: REPLACE
```

A FILE output defines a file location on the client where the output data will be written. The named file is created when the MapReduce job runs.

```
    - OUTPUT:
        NAME: gpmr_output
        FILE: /var/data/mapreduce/wordcount.out
```

As discussed in connection with FIGS. 8 and 9, embodiments of the invention utilize tasks. A TASK specification is optional, but can be useful in multi-stage MapReduce jobs. A task defines a complete end-to-end INPUT/MAP/REDUCE stage within a job pipeline. Once defined, a TASK object can be called as input for further processing stages.

For example, suppose you have defined a table INPUT called documents and another called keywords. Each respective table input is processed by its own MAP function document_map and keyword_map. If you wanted to use the results of these processing stages as input to further stages in your MapReduce job, you could define two tasks as follows:

```
    - TASK:
        NAME: document_prep
        SOURCE: documents
        MAP: document_map
    - TASK:
        NAME: keyword_prep
        SOURCE: keywords
        MAP: keyword_map
```

These named tasks can then be called as input in a later processing stage. In this example, we are defining a SQL QUERY input that joins the results of the two tasks we defined earlier (document_prep and keyword_prep).

```
    - INPUT:
        NAME: term_join
        QUERY: |
            SELECT doc.doc_id, kw.keyword_id, kw.term, kw.nterms,
                doc.positions as doc_positions,
                kw.positions as kw_positions
            FROM document_prep doc INNER JOIN keyword_prep kw
                ON (doc.term = kw.term)
```

Once you have defined all of the stages of your MapReduce job in the DEFINE section of a MapReduce document, an EXECUTE section is defined to specify the final INPUT/MAP/REDUCE stage. All of the objects named in the EXECUTE section are defined earlier in the DEFINE section.

```
    EXECUTE:
        - RUN:
            SOURCE: input_or_task_name
            TARGET: output_name
            MAP: map_function_name
            REDUCE: reduce_function_name
```

During execution of map and reduce functions, an embodiment of the invention makes use of the procedural languages built in to the Greenplum database. Greenplum requires these languages to be created in the database prior to executing MapReduce jobs. Using the CREATE LANGUAGE command creates the language in the database that will be used to execute MapReduce jobs.

An embodiment of the invention uses the YAML 1.1 document format and then implements its own schema for defining the various steps of a MapReduce job. YAML syntax is described at: http://yaml.org/spec/1.1/. The following discussion characterizes this syntax for a complete understanding of an embodiment of the invention.

Initially, the version of the YAML specification that is being used is specified. After that, three dashes ( - - - ) denote the start of a document, and three dots ( . . . ) indicate the end of a document without starting a new one. Comment lines are prefixed with a pound symbol (#). It is possible to declare multiple MapReduce documents in the same file:

```
    %YAML 1.1
    ---
    # Begin Document 1
    # ...
    ---
    # Begin Document 2
    # ...
```

In one embodiment of the invention, a MapReduce document 305 uses three basic types of data structures or nodes: scalars, sequences and mappings.

A scalar is a basic string of text indented by a space. If you have a scalar input that spans multiple lines, a preceding pipe (|) denotes a literal style, where all line breaks are significant. Alternatively, a preceding angle bracket (>) folds a single line break to a space for subsequent lines that have the same indentation level. If a string contains characters that have reserved meaning, the string must be quoted or the special character must be escaped with a backslash (\).

```
# Read each new line literally
somekey: |
    this value contains two lines
    and each line is read literally
# Treat each new line as a space
anotherkey: >
    this value contains two lines
    but is treated as one continuous line
# This quoted string contains a special character
ThirdKey: "This is a string: not a mapping"
```

A sequence is a list with each entry in the list on its own line denoted by a dash and a space (-). Alternatively, you can specify an inline sequence as a comma-separated list within square brackets. A sequence provides a set of data and gives it an order. When you load a list into the MapReduce program 310, the order is kept.

```
# list sequence
- this
- is
- a list
- with
- five scalar values
# inline sequence
[this, is, a list, with, five scalar values]
```

A mapping is used to pair up data values with identifiers called keys. Mappings use a colon and space (:) for each key: value pair, or can also be specified inline as a comma-separated list within curly braces. The key is used as an index for retrieving data from a mapping.

```
# a mapping of items
title: War and Peace
author: Leo Tolstoy
date: 1865
# same mapping written inline
{title: War and Peace, author: Leo Tolstoy, date: 1865}
```

Keys are used to associate meta information with each node and specify the expected node type (scalar, sequence or mapping). The MapReduce program 310 processes the nodes of a document in order and uses indentation (spaces) to determine the document hierarchy and the relationships of the nodes to one another. The use of white space is significant. White space should not be used simply for formatting purposes, and tabs should not be used at all.

Below is an example of a declaration of a MapReduce document schema.

```
%YAML 1.1
---
VERSION: 1.0.0.1
DATABASE: dbname
USER: db_username
HOST: master_hostname
PORT: master_port
DEFINE:
  - INPUT:
      NAME: input_name
      FILE:
          - hostname:/path/to/file
      GPFDIST:
          - hostname:port:/file_pattern
      TABLE: table_name
      QUERY: SELECT_statement
      EXEC: command_string
      COLUMNS:
          - field_name data_type
      FORMAT: TEXT | CSV
      DELIMITER: delimiter_character
      ESCAPE: escape_character
      NULL: null_string
      QUOTE: csv_quote_character
      ERROR_LIMIT: integer
      ENCODING: database_encoding
  - OUTPUT:
      NAME: output_name
      FILE: file_path_on_client
      TABLE: table_name
      KEYS:
          - column_name
      MODE: REPLACE | APPEND
  - MAP:
      NAME: function_name
      FUNCTION: function_definition
      LANGUAGE: perl | python
      PARAMETERS:
          - name type
      RETURNS:
          - name type
      OPTIMIZE: STRICT IMMUTABLE
      MODE: SINGLE | MULTI
  - TRANSITION | CONSOLIDATE | FINALIZE:
      NAME: function_name
      FUNCTION: function_definition
      LANGUAGE: perl | python
      PARAMETERS:
          - name type
      RETURNS:
          - name type
      OPTIMIZE: STRICT IMMUTABLE
      MODE: SINGLE | MULTI
  - REDUCE:
      NAME: reduce_job_name
      TRANSITION: transition_function_name
      CONSOLIDATE: consolidate_function_name
      FINALIZE: finalize_function_name
      INITIALIZE: value
      KEYS:
          - key_name
  - TASK:
      NAME: task_name
      SOURCE: input_name
      MAP: map_function_name
      REDUCE: reduce_function_name
      EXECUTE:
      - RUN:
          SOURCE: input_or_task_name
          TARGET: output_name
          MAP: map_function_name
          REDUCE: reduce_function_name
...
```

The first lines of the example document specify a version, database, user, host and port. The version defines the YAML specification. In this example, the current version is 1.0.0.1. The database field specifies which database is connected. If not specified, the MapReduce program 310 defaults to the default database. The user field is optioned. The user field specifies which database role to use to connect. If not specified, defaults to the current user or $PGUSER if set. The host filed is optional. The host field defines a master host name. If not specified, the Mapreduce program 310 defaults to a local host. The port field is optional. The port filed may define a master port. If not specified, a default port may be used.

The DEFINE section must have at least one INPUT definition. An INPUT, which is required, defines the input data.

Every MapReduce document must have at least one input defined. Multiple input definitions are allowed in a document, but each input definition can specify only one of these access types: a file, a gpfdist file distribution program, a table in the database, an SQL command, or an operating system command.

The name field specifies an input name. Names must be unique with regards to the names of other objects in a MapReduce job (such as map function, task, reduce function and output names). Also, names cannot conflict with existing objects in the database (such as tables, functions or views).

A sequence of one or more input files in the format: seghostname:/path/to/filename is also specified. The file must reside on a segment host of the distributed database. A GPFDIST field defines a sequence of one or more running gpfdist file distribution programs in the format: hostname[:port]/file_pattern. The table field names an existing table in the database. The query field may define a SQL SELECT command to run within the database. An EXEC field specifies an operating system command to run on the segment hosts. The command is run by all segment instances in the system by default. For example, if you have four segment instances per segment host, the command will be run four times on each host.

The COLUMNS field is optional. Columns are specified as: column_name [data_type]. If not specified, the default is value text. The DELIMITER character is what separates two data value fields (columns). A row is determined by a line feed character (0x0a).

The FORMAT field is optional. This field specifies the format of the data—either delimited text (TEXT) or comma separated values (CSV) format. If the data format is not specified, a default to TEXT may be used.

The DELIMITER field is optional for FILE, GPFDIST and EXEC inputs. This field specifies a single character that separates data values. The default is a tab character in TEXT mode and a comma in CSV mode. The delimiter character only appears between two data value fields. A delimiter is not placed at the beginning or end of a row.

The ESCAPE filed is optional for FILE, GPFDIST and EXEC inputs. This field specifies the single character that is used for C escape sequences (such as \n,\t,\100, and so on) and for escaping data characters that might otherwise be taken as row or column delimiters. Make sure to choose an escape character that is not used anywhere in your actual data values. The default escape character is a \ (backslash), however it is possible to specify any other character to represent an escape. It is also possible to disable escaping by specifying the value 'OFF' as the escape value. This is very useful for data such as web log data that has many embedded backslashes that are not intended to be escapes.

The NULL field is optional for FILE, GPFDIST and EXEC inputs. This field specifies the string that represents a null value. The default is \N in TEXT format, and an empty value with no quotations in CSV format. You might prefer an empty string even in TEXT mode for cases where you do not want to distinguish nulls from empty strings. Any input data item that matches this string will be considered a null value.

The QUOTE field is optional for FILE, GPFDIST and EXEC inputs. This field specifies the quotation character for CSV formatted files. The default is a double quote ("). In CSV formatted files, data value fields must be enclosed in double quotes if they contain any commas or embedded new lines. Fields that contain double quote characters are surrounded by double quotes, and the embedded double quotes are represented by a pair of consecutive double quotes. It is important to always open and close quotes correctly in order for data rows to be parsed correctly.

If the input rows have format errors, they will be discarded provided that the value defined by the ERROR_LIMIT is not reached on any segment instance during input processing. If the error limit is not reached, all good rows are processed and any error rows are discarded.

The ENCODING field defines the character set encoding to use for the data. The field may specify a string constant (such as 'SQL_ASCII'), an integer encoding number, or DEFAULT to use the default client encoding.

An OUTPUT field is optional. This field defines where to output the formatted data of this MapReduce job. If output is not defined, the default is STDOUT (standard output of the client). You can send output to a file on the client host or to an existing table in the database.

The NAME field specifies a name for this output. The default output name is STDOUT. Names must be unique with regards to the names of other objects in this MapReduce job (such as map function, task, reduce function and input names). Also, names cannot conflict with existing objects in the database (such as tables, functions or views).

The FILE field specifies a file location on the MapReduce client machine to output data in the format: /path/to/filename. The TABLE field Specifies the name of a table in the database to output data. If this table does not exist prior to running the MapReduce job, it will be created using the distribution policy specified with KEYS. The KEYS field is optional for TABLE output. This field specifies the column(s) to use as the database distribution key. If the EXECUTE task contains a REDUCE definition, then the REDUCE keys will be used as the table distribution key by default. Otherwise, the first column of the table will be used as the distribution key.

The MODE field is optional for TABLE output. If not specified, the default is to create the table if it does not already exist, but error out if it does exist. Declaring APPEND adds output data to an existing table (provided the table schema matches the output format) without removing any existing data. Declaring REPLACE will drop the table if it exists and then recreate it. Both APPEND and REPLACE will create a new table if one does not exist.

The MAP expression is required. Each MAP function takes data structured in (key, value) pairs, processes each pair, and generates zero or more output (key, value) pairs. The MapReduce program then collects all pairs with the same key from all output lists and groups them together. This output is then passed to the REDUCE task, which, in one embodiment, is comprised of TRANSITION|CONSOLIDATE|FINALIZE functions.

There is one predefined MAP function named IDENTITY that returns (key, value) pairs unchanged. Although (key, value) are the default parameters, you can specify other prototypes as needed.

TRANSITION, CONSOLIDATE and FINALIZE are all component pieces of REDUCE. A TRANSITION function is required. CONSOLIDATE and FINALIZE functions are optional. By default, all take state as the first of their input PARAMETERS, but other prototypes can be defined as well.

A TRANSITION function iterates through each value of a given key and accumulates values in a state variable. When the transition function is called on the first value of a key, the state is set to the value specified by INITIALIZE of a REDUCE job (or the default state value for the data type). A transition takes two arguments as input; the current state of the key reduction, and the next value, which then produces a new state.

If a CONSOLIDATE function is specified, TRANSITION processing is performed at the segment-level before redistributing the keys across the interconnect for final aggregation (two-phase aggregation). Only the resulting state value for a given key is redistributed, resulting in lower interconnect traffic and greater parallelism. CONSOLIDATE is handled like a TRANSITION, except that instead of (state+value)→state, it is (state+state)→state.

If a FINALIZE function is specified, it takes the final state produced by CONSOLIDATE (if present) or TRANSITION and does any final processing before emitting the final result. TRANSITION and CONSOLIDATE functions cannot return a set of values. If you need a REDUCE job to return a set, then a FINALIZE is necessary to transform the final state into a set of output values.

A NAME field defines a name for the function. Names must be unique with regards to the names of other objects in this MapReduce job (such as function, task, input and output names). Also, names cannot conflict with existing objects in the database (such as tables, functions or views). The FUNCTION field is optional. This field specifies the full body of the function using the specified LANGUAGE. If FUNCTION is not specified, then a built-in SQL function is used within this MapReduce script.

The LANGUAGE field is required when FUNCTION is used. This field specifies the implementation language used to interpret the function. Various languages may be used, including PERL, Python. C, pgsql, R and SQL.

The PARAMETERS field is optional. The field defines function input parameters. The default type is text. The MAP field has a default of key text, value text. The TRANSITION field has a default of state text, value text. The CONSOLIDATE field has a default—state1 text, state2 text (must have exactly two input parameters of the same data type). The FINALIZE field has a default—state text (single parameter only). The RETURNS field is optional. The default return type is text. The MAP field default is key text, value text. The TRANSITION field default is state text (single return value only). The CONSOLIDATE field default is state text (single return value only). The FINALIZE field default is value text. The OPTIMIZE field is optional; it provides optional optimization parameters for the function. The STRICT field defines a function that is not affected by NULL values. The IMMUTABLE field defines a function that will always return the same value for a given input. The MODE field is optional; it specifies the number of rows returned by the function. The MULTI field returns 0 or more rows per input record. The return value of the function must be an array of rows to return, or the function must be written as an iterator using yield in Python or return_next in Perl. MULTI is the default mode for MAP and FINALIZE functions. The SINGLE field returns exactly one row per input record. SINGLE is the only mode supported for TRANSITION and CONSOLIDATE functions. When used with MAP and FINALIZE functions, SINGLE mode can provide modest performance improvement.

The REDUCE function is required. A REDUCE definition names the TRANSITION|CONSOLIDATE|FINALIZE functions that comprise the reduction of (key, value) pairs to the final result set. There are also several predefined REDUCE jobs you can execute, which all operate over a column named value:

IDENTITY—returns (key, value) pairs unchanged
SUM—calculates the sum of numeric data
AVG—calculates the average of numeric data
COUNT—calculates the count of input data
MIN—calculates minimum value of numeric data
MAX—calculates maximum value of numeric data The NAME field is required; it specifies the name of this REDUCE job. Names must be unique with regards to the names of other objects in this MapReduce job (function, task, input and output names). Also, names cannot conflict with existing objects in the database (such as tables, functions or views). The TRANSITION field is required; it names the TRANSITION function. The CONSOLIDATE field is optional; it names the CONSOLIDATE function. The FINALIZE field is optional; it names the FINALIZE function. The INITIALIZE field is optional for text and float data types. The field is required for all other data types. The default value for text is ". The default value for float is 0.0. This sets the initial state value of the TRANSITION function. The KEYS field is optional; it defaults to [key, *]. When using a multi-column reduce it may be necessary to specify which columns are key columns and which columns are value columns. By default, any input columns that are not passed to the TRANSITION function are key columns, and a column named key is always a key column even if it is passed to the TRANSITION function. The special indicator * indicates all columns not passed to the TRANSITION function. If this indicator is not present in the list of keys then any unmatched columns are discarded.

The specification of a TASK is optional. A TASK defines a complete end-to-end INPUT/MAP/REDUCE stage within a MapReduce job pipeline. It is similar to EXECUTE except it is not immediately executed. A task object can be called as INPUT to further processing stages. The NAME field is required to name the task. Names must be unique with regards to the names of other objects in this MapReduce job (such as map function, reduce function, input and output names). Also, names cannot conflict with existing objects in the database (such as tables, functions or views). The SOURCE field defines the name of an INPUT or another TASK. The MAP field is optional; it may provide the name of a MAP function. If not specified, it defaults to IDENTITY. The REDUCE field is optional; it provide a name of a REDUCE function. If not specified, it defaults to IDENTITY.

The EXECUTE field defines the final INPUT/MAP/REDUCE stage within a MapReduce job pipeline. The SOURCE field is required; it provides the name of an INPUT or TASK. The TARGET field is optional; it provides the name of an OUTPUT. The default output is STDOUT. The MAP field is optional; it provides the name of a MAP function. If not specified, it defaults to IDENTITY. The REDUCE field is optional; it provides the name of a REDUCE function. This field defaults to IDENTITY.

Figure 10:
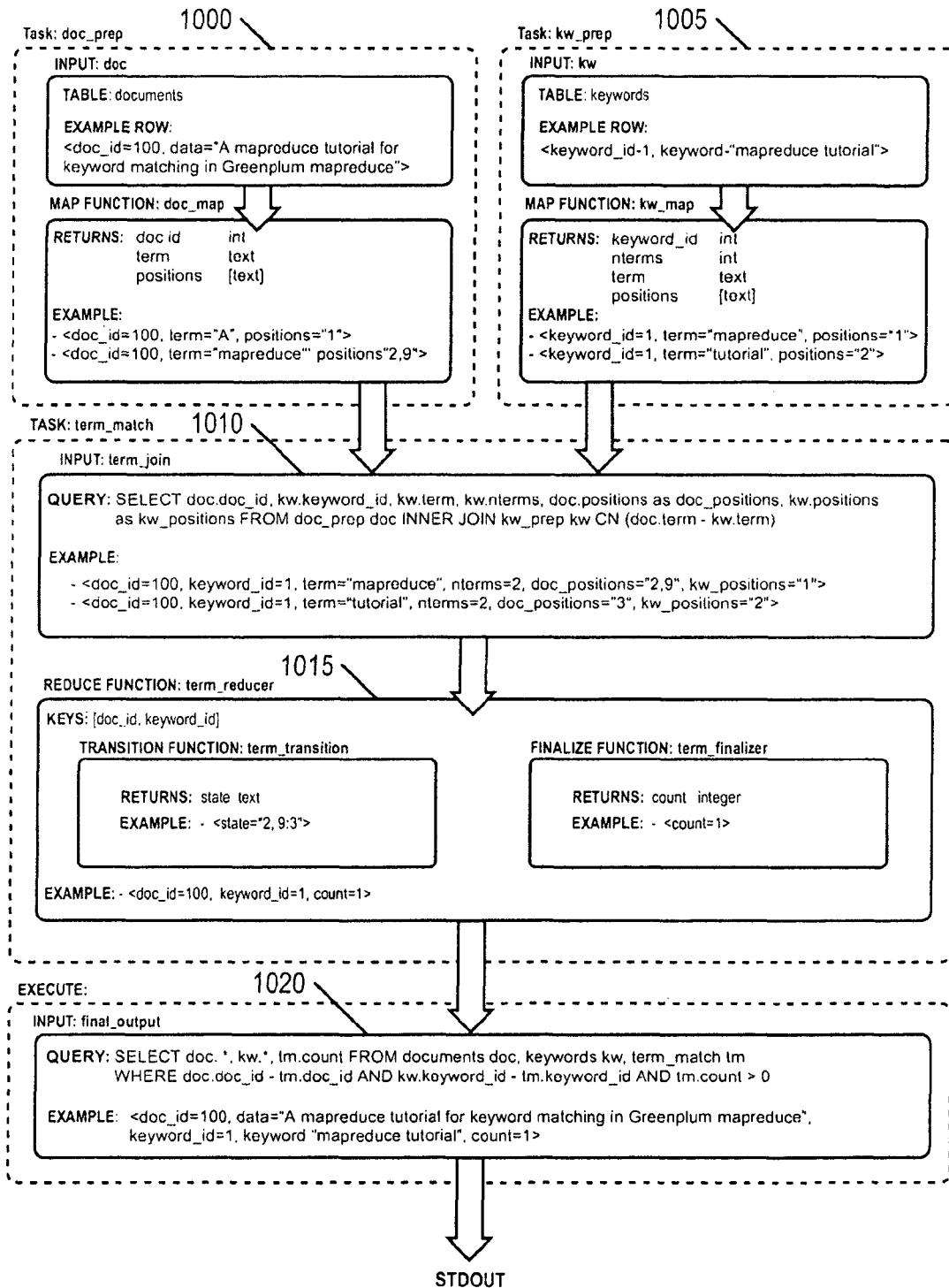
FIG. 10 illustrates processing associated with an exemplary implementation of an embodiment of the invention.

The following is an example MapReduce document 305 that may be processed in accordance with an embodiment of the invention. The code is annotated to describe its operations. In addition, the operations of the code are abstracted into FIG. 10. References to FIG. 10 are made within the annotations.

```
# This example MapReduce job processes documents and looks for keywords in them.
# It takes two database tables as input:
# - documents (doc_id integer, url text, data text)
# - keywords (keyword_id integer, keyword text)#
```

```
# The documents data is searched for occurrences of keywords and returns results of
# url, data and keyword (a keyword can be multiple words, such as "high performance
# computing")
%YAML 1.1
---
VERSION: 1.0.0.1
# Connect to Greenplum Database using this database and role
DATABASE: webdata
USER: jsmith
# Begin definition section
DEFINE:
    # Declare the input, which selects all columns and rows from the
    # 'documents' and 'keywords' tables.
    - INPUT:
       NAME: doc
       TABLE: documents
    - INPUT:
       NAME: kw
       TABLE: keywords
# Define the map functions to extract terms from documents and keyword
# This example simply splits on white space, but it would be possible
# to make use of a python library like nltk (the natural language toolkit)
# to perform more complex tokenization and word stemming. The inputs are shown in
# blocks 1000 and 1005 of Figure 10.
    - MAP:
       NAME: doc_map
       LANGUAGE: python
       FUNCTION: |
         i = 0 # the index of a word within the document
         terms = { } # a hash of terms and their indexes within the document
         # Lower-case and split the text string on space
         for term in data.lower( ).split( ):
            i = i + 1 # increment i (the index)
         # Check for the term in the terms list:
         # if stem word already exists, append the i value to the array entry
         # corresponding to the term. This counts multiple occurrences of the
         #word.
         # If stem word does not exist, add it to the dictionary with position
         #i.
         # For example:
            # data: "a computer is a machine that manipulates data"
            # "a" [1, 4]
            # "computer" [2]
            # "machine" [3]
            # ...
            if term in terms:
               terms[term] += ','+str(i)
            else:
               terms[term] = str(i)
         # Return multiple lines for each document. Each line consists of
         # the doc_id, a term and the positions in the data where the term
         #appeared.
         # For example:
         # (doc_id => 100, term => "a", [1,4]
         # (doc_id => 100, term => "computer", [2]
         # ...
         for term in terms:
            yield([doc_id, term, terms [term]])
       OPTIMIZE: STRICT IMMUTABLE
       PARAMETERS:
         - doc_id integer
         - data text
       RETURNS:
         - doc_id integer
         - term text
         - positions text
         #See block 1000 of Figure 10.
# The map function for keywords is almost identical to the one for documents
# but it also counts of the number of terms in the keyword.
    - MAP:
       NAME: kw_map
       LANGUAGE: python
       FUNCTION: |
         i = 0
         terms = { }
         for term in keyword.lower( ).split( ):
            i = i + 1
            if term in terms:
               terms[term] += ','+str(i)
```

```
        else:
            terms[term] = str(i)
        # output 4 values including i (the total count for term in terms):
        yield([keyword_id, i, term, terms[term]])
  OPTIMIZE: STRICT IMMUTABLE
  PARAMETERS:
    - keyword_id integer
    - keyword text
  RETURNS:
    - keyword_id integer
    - nterms integer
    - term text
    - positions text
# A TASK is an object that defines an entire INPUT/MAP/REDUCE stage
# within a Greenplum MapReduce pipeline. It is like EXECUTION, but it is
# executed only when called as input to other processing stages.
# Identify a task called 'doc_prep' which takes in the 'doc' INPUT defined earlier
# and runs the 'doc_map' MAP function which returns doc_id, term, [term_position]
- TASK:
  NAME: doc_prep
  SOURCE: doc
  MAP: doc_map
  #See block 1005 of Figure 10.
# Identify a task called 'kw_prep' which takes in the 'kw' INPUT defined earlier
# and runs the kw_map MAP function which returns kw_id, term, [term_position]
- TASK:
  NAME: kw_prep
  SOURCE: kw
  MAP: kw_map
# One advantage of Greenplum MapReduce is that MapReduce tasks can be
# used as input to SQL operations and SQL can be used to process a MapReduce task.
# This INPUT defines a SQL query that joins the output of the 'doc_prep'
# TASK to that of the 'kw_prep' TASK. Matching terms are output to the 'candidate'
# list (any keyword that shares at least one term with the document).
- INPUT:
  NAME: term_join
  QUERY: |
    SELECT doc.doc_id, kw.keyword_id, kw.term, kw.nterms,
        doc.positions as doc_positions,
        kw.positions as kw_positions
    FROM doc_prep doc INNER JOIN kw_prep kw ON (doc.term = kw.term)
#See block 1010 of Figure 10.
#In Greenplum MapReduce, a REDUCE function is comprised of one or more functions.
# A REDUCE has an initial 'state' variable defined for each grouping key. that is
# A TRANSITION function adjusts the state for every value in a key grouping.
# If present, an optional CONSOLIDATE function combines multiple
# 'state' variables. This allows the TRANSITION function to be executed locally at
  # the segment-level and only redistribute the accumulated 'state' over
  # the network. If present, an optional FINALIZE function can be used to perform
  # final computation on a state and emit one or more rows of output from the state.
  #
  # This REDUCE function is called 'term_reducer' with a TRANSITION function
  # called 'term_transition' and a FINALIZE function called 'term_finalizer' - see
  # block 1015 of Figure 10.
- REDUCE:
   NAME: term_reducer
   TRANSITION: term_transition
   FINALIZE: term_finalizer
- TRANSITION:
   NAME: term_transition
   LANGUAGE: python
   PARAMETERS:
     - state text
     - term text
     - nterms integer
     - doc_positions text
     - kw_positions text
   FUNCTION: |
     # 'state' has an initial value of '' and is a colon delimited set
     # of keyword positions. keyword positions are comma delimited sets of
     # integers. For example, '1,3,2:4:'
     # If there is an existing state, split it into the set of keyword
     positions
     # otherwise construct a set of 'nterms' keyword positions - all empty
     if state:
         kw_split = state.split(':')
```

```
        else:
            kw_split = [ ]
            for i in range(0,nterms):
                kw_split.append('')
        # 'kw_positions' is a comma delimited field of integers indicating what
        # position a single term occurs within a given keyword.
        # Splitting based on ',' converts the string into a python list.
        # add doc_positions for the current term
        for kw_p in kw_positions.split(','):
            kw_split[int(kw_p)-1] = doc_positions
        # This section takes each element in the 'kw_split' array and strings
        # them together placing a ':' in between each element from the array.
        # For example: for the keyword "computer software computer hardware",
        # the 'kw_split' array matched up to the document data of
        # "in the business of computer software software engineers"
        # would look like: ['5', '6,7', '5', '']
        # and the outstate would look like: 5:6,7:5:
        outstate = kw_split[0]
        for s in kw_split[1:]:
            outstate = outstate + ':' + s
        return outstate
- FINALIZE:
    NAME: term_finalizer
    LANGUAGE: python
    RETURNS:
       - count integer
    MODE: MULTI
    FUNCTION: |
        if not state:
            return 0
        kw_split = state.split(':')
        # This function does the following:
        # 1) Splits 'kw_split' on ':'
        # for example, 1,5,7:2,8 creates '1,5,7' and '2,8'
        # 2) For each group of positions in 'kw_split', splits the set on ','
        # to create ['1','5','7'] from Set 0: 1,5,7 and
        # eventually ['2', '8'] from Set 1: 2,8
        # 3) Checks for empty strings
        # 4) Adjusts the split sets by subtracting the position of the set
        # in the 'kw_split' array
        # ['1','5', '7'] – 0 from each element = ['1','5','7']
        # ['2', '8'] – 1 from each element = ['1', '7']
        # 5) Resulting arrays after subtracting the offset in step 4 are
        # intersected and their overlaping values kept:
        # ['1','5','7'].intersect['1', '7'] = [1,7]
        # 6) Determines the length of the intersection, which is the number of
        # times that an entire keyword (with all its pieces) matches in the
        # document data. See block 1015 of Figure 10.
        previous = None
        for i in range(0,len(kw_split)):
            isplit = kw_split[i].split(',')
            if any(map(lambda(x): x == '', isplit)):
                return 0
            adjusted = set(map(lambda(x): int(x)–i, isplit))
            if (previous):
                previous = adjusted.intersection(previous)
            else:
                previous = adjusted
        # return the final count
        if previous:
            return len(previous)
        return 0
# Define the 'term_match' task which is then executed as part
# of the 'final_output' query. It takes the INPUT 'term_join' defined
# earlier and uses the REDUCE function 'term_reducer' defined earlier
- TASK:
    NAME: term_match
    SOURCE: term_join
    REDUCE: term_reducer
- INPUT:
    NAME: final_output
    QUERY: |
        SELECT doc.*, kw.*, tm.count
        FROM documents doc, keywords kw, term_match tm
        WHERE doc.doc_id = tm.doc_id
            AND kw.keyword_id = tm.keyword_id
            AND tm.count > 0
# Execute this MapReduce job and send output to STDOUT
# See block 1020 of Figure 10.
```

-continued

```
EXECUTE:
  - RUN:
      SOURCE: final_output
      TARGET: STDOUT
```

Figure 11:
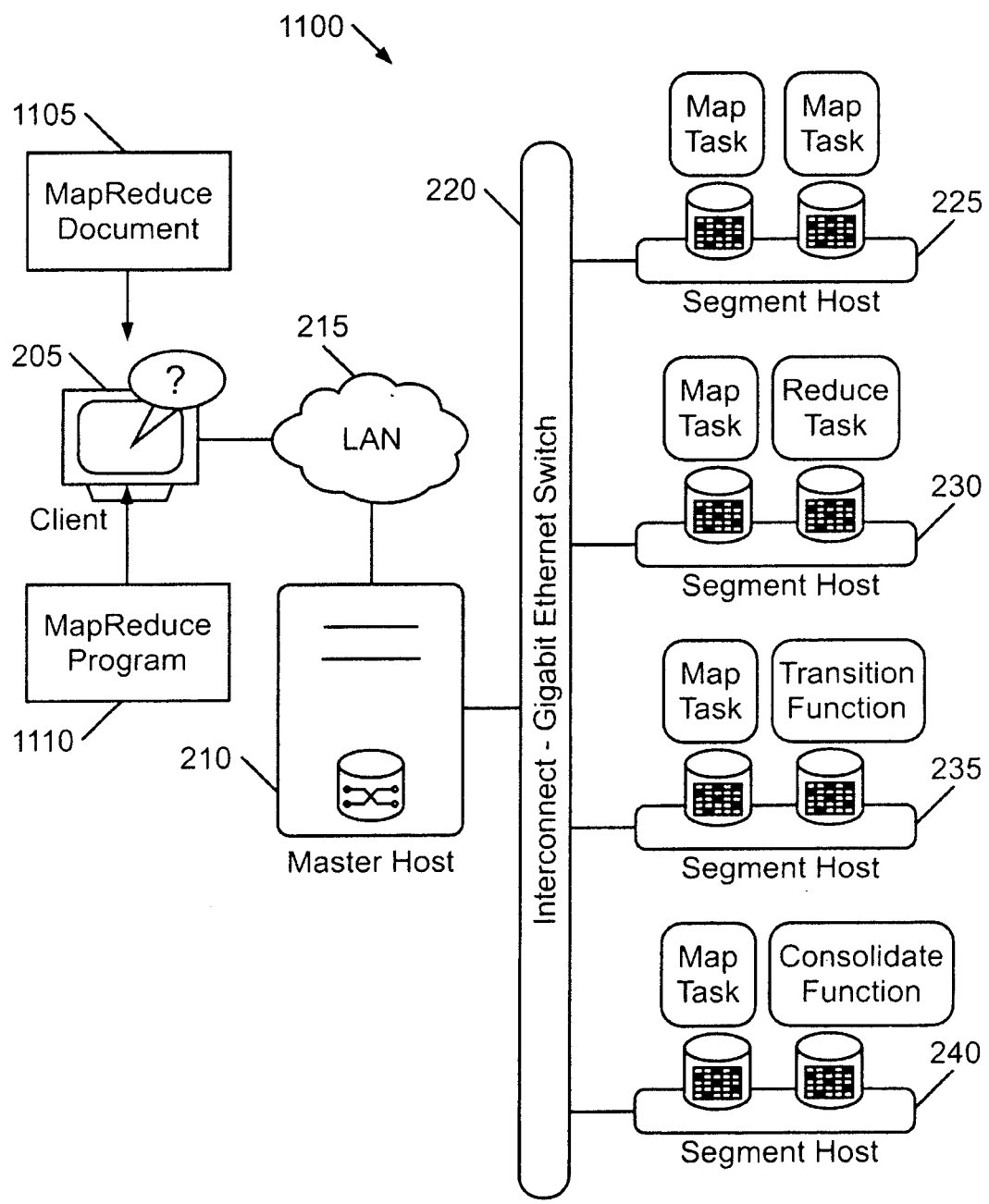
FIG. 11 illustrates a network configured to implement operations of the invention.

FIG. 11 illustrates the operations of the invention implemented in a network 1100. A client device 205 is used to specify a map-reduce document 1105. A map-reduce program 1110 is resident on the client device 205. The operations specified in the map-reduce document 1105 are passed over a LAN 215 to a master host 210. The master host distributes operations across various segment hosts 225, 230, 235 and 240. Segment host 225 process two map tasks. Segment host 230 processes a map task and a reduce task. Segment host 235 processes a map task and transition function. Finally, segment host 240 processes a map task and a consolidate function.

The architecture of FIG. 11 is exemplary. Operations of the invention may be implemented in any number of ways. It is the operations of the invention that are significant, not the particular manner or location in which those operations are performed.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable non-transitory storage medium for storing executable instructions, comprising executable instructions for controlling the operation of a computer in a distributed relational database to:
   define a map-reduce document that coordinates processing of data from an input source in database segment hosts of the distributed relational database using map-reduce functions comprising map functions and reduce functions in a computer executable scripting language and database SQL queries in a structured query language (SQL), the map-reduce document specifying the map-reduce functions and the database SQL queries and integrating both the map-reduce functions and the database SQL queries in other structured query language queries for processing by said database segment hosts; and
   submit said map-reduce document to a map-reduce program associated with a core engine of the distributed relational database that distributes said map-reduce functions to the database segment hosts distributed across said distributed relational database for execution as SQL queries of both the map-reduce functions and the SQL queries specified by the map-reduce document in said distributed relational database segment hosts.

2. The computer readable non-transitory storage medium of claim 1, wherein the map-reduce document specifies the input source, a map function, a reduce function, and an output target.

3. The computer readable non-transitory storage medium of claim 2, wherein the input source includes input sources selected from a file, a table in the distributed relational database, a SQL query to the distributed relational database, and an operating system command.

4. The computer readable non-transitory storage medium of claim 3, wherein the input source resides on a database node that processes the input source.

5. The computer readable non-transitory storage medium of claim 3, wherein the input source is distributed into database segments across a plurality of database nodes and is formed using a further SQL query to combine data from said database segments.

6. The computer readable non-transitory storage medium of claim 5, wherein specifying the input source results in an automatic mapping to the database segments across the plurality of nodes.

7. The computer readable non-transitory storage medium of claim 5 further comprising executable instructions to process data from a plurality of data sources selected from a file, a table in said database segments, a SQL query to the database segments, and an operating system command.

8. The computer readable non-transitory storage medium of claim 1, wherein the map function is selected from a built-in map function and a user-defined map function.

9. The computer readable non-transitory storage medium of claim 1, wherein the reduce function is selected from a built-in reduce function and a user-defined reduce function.

10. The computer readable non-transitory storage medium of claim 1, wherein the map-reduce functions comprise executable instructions to process a list of input parameters from the input source to generate a list of output parameters, the output parameters having a SQL query language data type and a key.

11. The computer readable non-transitory storage medium of claim 10, wherein the reduce function comprises a transition function with executable instructions to process the list of output parameters into an intermediate state output, the intermediate state output comprising accumulated state values associated with a key.

12. The computer readable non-transitory storage medium of claim 11 wherein the intermediate state output includes a transition output, a consolidate output that accumulates multiple state values into a single state value, and a finalize output.

13. The computer readable non-transitory storage medium of claim 1, wherein the distributed relational database comprises a master database instance, a plurality of segment database instances, and a networking layer.

14. The computer readable non-transitory storage medium of claim 13, further comprising executable instructions to produce a transition output at one or more of the plurality of segment database instances.

15. The computer readable non-transitory storage medium of claim 13, further comprising executable instructions to provide a consolidate output through the networking layer.

16. The computer readable non-transitory storage medium of claim 1, further comprising executable instructions to define a task object for specifying the input source and a task object function.

17. The computer readable non-transitory storage medium of claim 16, wherein the task object function comprises one of a map function and a reduce function.

18. The computer readable non-transitory storage medium of claim 16, further comprising including executable instructions to execute the task object function in a SQL query to the distributed relational database.

19. The computer readable non-transitory storage medium of claim 1, wherein the map-reduce document is integrally processed during Structured Query Language (SQL) query processing.

20. The computer readable non-transitory storage medium of claim 1 further comprising executable instructions to utilize the SQL queries to execute said map functions and said reduce functions.

21. The computer readable non-transitory storage medium of claim 1 further comprising executable instructions to execute said map functions and said reduce functions as part of the SQL queries to the distributed relational database.

22. The computer readable non-transitory storage media of claim 1, wherein said computer executable scripting language is selected from one of PERL and Python scripting languages.

23. A method of integrating map-reduce functions and queries in a distributed relational database, comprising:
defining a map-reduce document that coordinates processing of data from an input source in database segment hosts of the distributed relational database using map-reduce functions comprising map functions and reduce functions and database SQL queries in a structured query language (SQL), the map-reduce document specifying the map-reduce functions and the database SQL queries and integrating both the map-reduce functions and the database SQL queries in other structured query language queries for processing by said database segment hosts; and
submitting said map-reduce document to a map-reduce program associated with a core engine of the distributed relational database that distributes said map-reduce functions to the database segment hosts across said distributed relational database for execution as SQL queries of both the map-reduce functions and the SQL queries specified by the map-reduce document in said distributed relational database segment hosts.

24. The method of claim 23, wherein said defining said map-reduce document comprises defining a task object specifying the input source of data as one or more of a file, a table in the distributed relational database, a SQL query, and an operating system command, and specifying the map-reduce function as one or both of a map function and a reduce function that operate on the data from said input source.

25. The method of claim 23, wherein said distributed relational database is a parallel relational database, and said map-reduce functions and said SQL queries are user defined.

* * * * *